July 24, 1962

B. H. MOSBACHER 3,045,778

LUBE PUMPING SYSTEM

Filed March 10, 1960

Inventor
Bruce H. Mosbacher
By
McCanna, Moresback & Pillote
Atty's

United States Patent Office 3,045,778
Patented July 24, 1962

3,045,778
LUBE PUMPING SYSTEM
Bruce H. Mosbacher, Rockford, Ill., assignor to Roper Hydraulics, Inc., Commerce, Ga., a corporation of Georgia
Filed Mar. 10, 1960, Ser. No. 14,051
6 Claims. (Cl. 184—6)

This invention relates to lubricant pumping systems and particularly to a system for use with multiple lubricant sumps.

In some lubrication systems, the lubricant will not always return to a single sump under all operating conditions of the apparatus with which the lubricant system is associated, and it is necessary to provide more than one sump to collect the lubricant. For example, the position of an aircraft changes when the airplane climbs and dives, rolls or is in inverted flight. The lubricant is returned to the sumps by gravity and it is therefore the practice to provide separate sumps, as for climbing and diving, and for normal and inverted flight. Heretofore, separate scavenge pumps have been provided for each sump with the outputs of the several scavenge pumps connected to assure a supply of lubricant to the machine when lubricant is contained in only one of the sumps. These prior lubrication systems thus necessitated duplication of the pumping apparatus and were relatively expensive. Moreover, when one of the sumps became dry, the associated pump also ran dry and caused excessive wear on the pump. In addition, the relatively large amount of air introduced, when one of the sumps ran dry and the associated pump began to pump air, materially aggravated the problem of separating the air and lubricant.

An important object of this invention is to provide an improved lubrication system which overcomes the aforementioned problems.

A more particular object of this invention is to provide a lubrication system for use with multiple sumps in which one lubricant pump is provided and arranged to withdraw lubricant from a plurality of sumps to minimize the number of scavenge pumps required in the system.

A further object of this invention is to provide a lubrication system in accordance with the foregoing object in which the lubricant pumps are so arranged as to be adequately lubricated whenever lubricant is supplied thereto from only one of the sumps.

Yet another object of this invention is to provide an improved lubrication system for use with multiple sumps in which the air drawn in with the lubricant, or when one of the sumps run dry, is centrifugally separated from the lubricant by the scavenge pump and the air and lubricant separately discharged from the pump.

Figure 1:
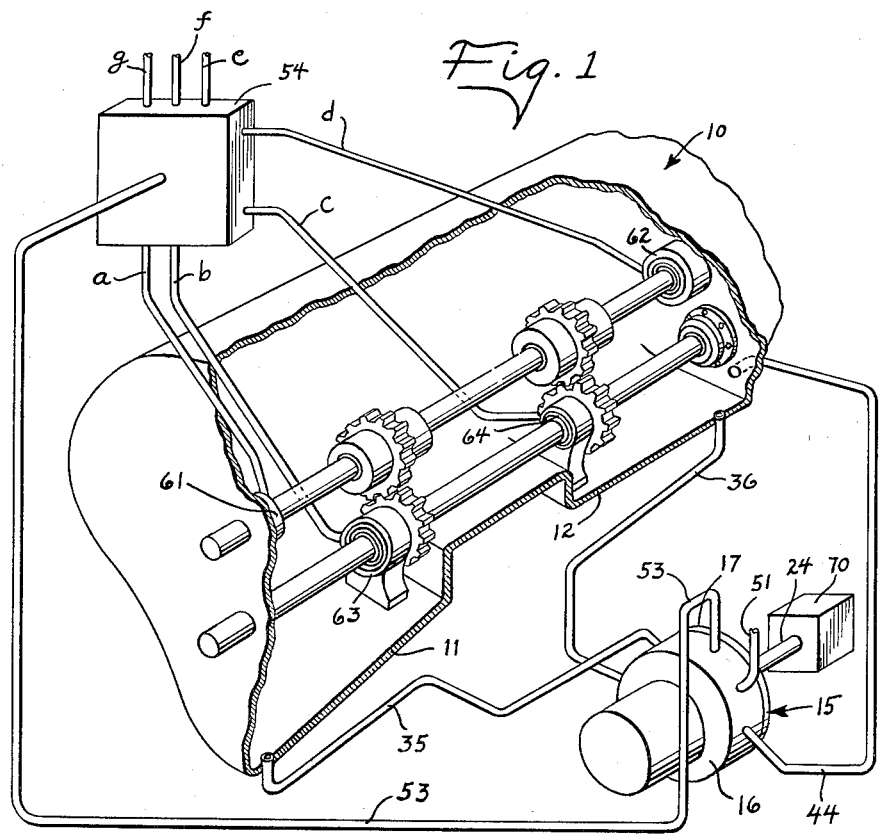
Figure 2:
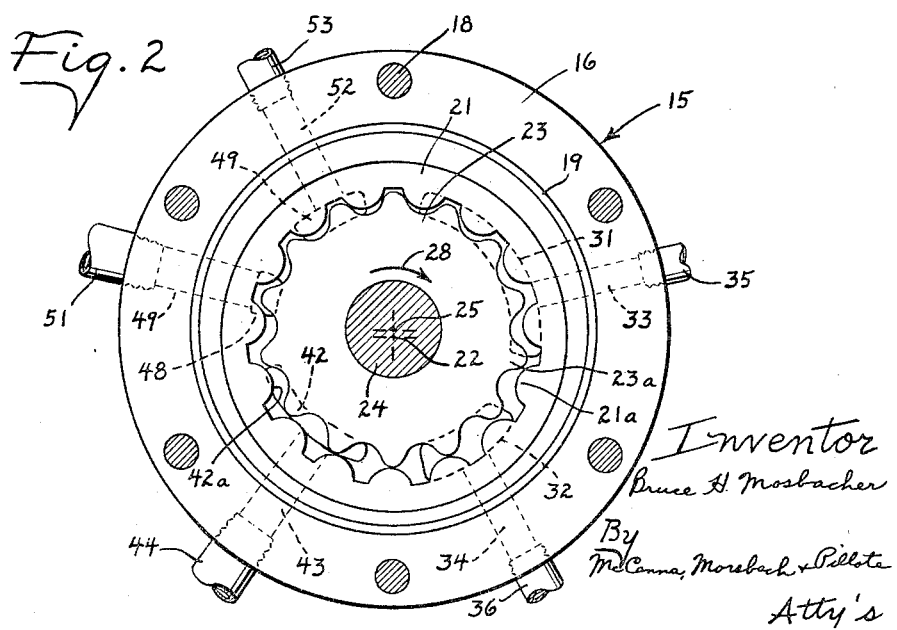

These, together with various ancillary objects and advantages of this invention will be more readily appreciated as the same becomes better understood by reference to the following detailed description when taken in connection with the accompanying drawings wherein:

FIGURE 1 is a diagrammatic view of an apparatus having multiple lubricant sumps and the lubrication system of the present invention applied thereto; and FIG. 2 is a sectional view through the lubricant pump.

The lubrication system of the present invention is generally adapted for use with apparatus requiring a plurality of lubricant sumps and may, for example, be used in aircraft wherein it is necessary to provide separate sumps for collecting the lubricant. The lubrication system is diagrammatically shown in FIGURE 1 applied to an apparatus 10 having first and second sumps 11 and 12 for collecting the lubricant. The apparatus 10 may form a part of an aircraft in which event the sumps 11 and 12 are arranged to collect the lubricant when the aircraft is respectively climbing and diving. The sumps may be otherwise arranged with respect to each other such as adjacent opposite sides of the apparatus 10 to collect the lubricant when the plane rolls in one direction or the other direction, or may, in some applications, be located above and below each other to collect the lubricant when the aircraft is in normal or inverted flight. The specific arrangement of the sumps with respect to the apparatus being lubricated will vary dependent upon the specific apparatus and the operating conditions to which the apparatus is subjected during use.

The lubricant pump 15 is of the rotary positive-displacement type and includes a casing 16 having an end plate 17 attached thereto by fasteners 18 and sealed as by an O-ring 19 to form a pumping cavity in the casing. The rotary positive-displacement pump herein illustrated is of the gerotor type, it being understood that a sliding vane type pump may also be used. The rotary positive-displacement pump provides segregated pumping compartments which progressively expand in one sector of the pump chamber to draw a charge of fluid into the pump chamber and which progressively contract in volume in another sector of the pump chamber to discharge the fluid from the chamber. The gerotor type pump illustrated includes an outer gear 21 which is rotatably supported in the casing for rotation about an axis designated 22 and an inner rotor 23 which is mounted for rotation in the casing by a shaft 24 for rotation about an axis 25 offset from the axis 22. The rotor 23 and outer gear 21 are thus located eccentrically with respect to each other and define a pumping chamber between the outer periphery of the rotor 23 and the inner periphery of the gear 21. As is apparent, when the rotor is turned in a direction as indicated by the arrow 28, the pumping chamber in that sector thereof located at the right hand side of the plane through the axes 22 and 25 will progressively increase in volume and the pumping chamber at the other or left side of the aforementioned plane will progressively decrease in volume. The outwardly extending teeth 23a on the rotor and the inwardly extending teeth 21a on the ring gear interengage and separate the pumping chamber into segregated compartments which progressively expand in the right hand sector of the pumping chamber and progressively decrease in volume in the left hand sector of the pumping chamber. The vanes in a sliding vane pump function in a similar manner to segregate the eccentric pumping chamber into separate compartments.

In accordance with the present invention, a plurality of inlet ports, herein shown two in number, are provided to communicate with the inlet sector of the pumping chamber, it being understood that more than two inlet ports may be provided if desired for use in apparatus having more than two sumps. The ports designated 31 and 32 communicate with the pumping chamber at the inlet sector thereof and are annually spaced apart a distance approximately equal to one tooth space to prevent by-passing of fluid therebetween. As the pumping compartments rotate past the first port 31, fluid is drawn thereinto through a first inlet passage 33 and, as the compartments rotate past the second inlet port 32, additional fluid is drawn thereinto through the second inlet passage 34. Thus, each of the pumping compartments between the inner rotor and the outer gear 21 sequentially receive fluid from the first and second inlet ports 31 and 32. The inlet passages 33 and 34 are connected as through conduits 35 and 36 respectively to the sumps 11 and 12. Thus, the pump withdraws liquid from a plurality of sumps and, if one of the sumps should run dry, liquid is still supplied to the pump from the other sump. The pump does not operate without lubrication when only one of the sumps becomes dry since each pumping compartment in the pumping chamber receives only a portion of its liquid from each sump. In some applications, one sump may have more inflow than the other sump, as would occur if a greater number of bearings drained to one sump than the other, and in such cases the size of the inlet ports 31 and 32 can be adjusted so that the pump will withdraw relatively greater quantity of fluid from one sump than the other. In the embodiment shown, the size of port 31 is selected with relation to port 32 so as to withdraw more fluid from sump 11 than from sump 12.

The liquid is discharged from the pump at the other or discharged sector of the pumping chamber. However, some air is generally entrained in the lubricant as it returns to the sumps and, when one of the sumps runs dry, considerable additional air is drawn into the pump 15. The pump may advantageously be arranged in the manner described and claimed in the copending application of Bruce H. Mosbacher, Serial No. 832,693 filed August 10, 1959, to centrifugally separate the lubricant and air and discharge the same in segregated streams. For this purpose, an air discharge port 42 is arranged to communicate with the pumping compartments at the discharge sector of the chamber and has its outer edge 42a spaced radially inwardly from the roots of the teeth of the outer gear 21. As the mixture of lubricant and air is rotated by the rotor 23. The relatively dense lubricant moves to the outer periphery of the compartments and the relatively lighter air moves toward the inner periphery. The air discharge port 42 communicates with the compartments adjacent the periphery of the inner rotor to discharge the air from the compartments. The amount of liquid which remains in the compartments between the inner and outer rotors is determined by the position of the outer edge 42a of the air outlet port and the arcuate length of the outlet port. The shape and size of the air outlet port 42 is preferably selected so as to discharge a volume from the pumping compartments as they move therepast which is slightly in excess of the volume of air normally contained in the lubricant so that substantially air-free lubricant remains in the compartments after they have passed the air outlet port. The air outlet port is connected through an outlet passage 43 to a return line 44 leading to one of the sumps such as 12.

The liquid remaining in the pumping compartments after they have passed the air outlet port 42 is discharged to the point of use. However, the lubricant is generally supplied to a plurality of bearings. In order to divide the flows between different bearings or groups of bearings, a plurality of lubricant discharge ports may be provided, herein shown two in number and designated 48 and 49. The lubricant discharge ports are annularly spaced from each other and from the air discharge port 42 a distance sufficient to prevent significant cross-flow between the adjacent outlet ports. Fluid from one of the outlet ports such as 48 is delivered through a lubricant passage 49 to a delivery tube 51 leading to one bearing or group of bearings (not shown), and lubricant from the other lubricant discharge port 49 is delivered through a passage 52 to a conduit 53 leading to a different group of bearings through a lubricant distributor 54. By suitably proportioning the relative sizes of the fluid discharge ports 48 and 49, the relative amounts of lubricant delivered to the different bearings or groups of bearings can be varied as desired. The lubricant distributor may be of any conventional construction, details of which form no part of the present invention. The lubricant distributor may, for example, be a series of nozzles (not shown) or a flow divider-type pump which proportions the flow of lubricant through a plurality of tubes designated $a$–$g$. Certain of the tubes such as $a$ and $d$ lead to main bearings such as 61 and 62 while others of the tubes such as $b$ and $c$ lead to intermediate bearings 63 and 64. The pump 15 is driven in any suitable manner as by a mechanism diagrammatically indicated at 70 in FIG. 1 and which may be a separate motor or a power take-off drive as desired.

From the foregoing it is thought that the operation of the device will be readily understood. As the pump rotor 23 is rotated in the direction indicated by the arrow 28 in FIG. 2, fluid is drawn into the inlet ports 31 and 32 from both of the sumps 11 and 12. If lubricant is returned substantially uniformly to both sumps, lubricant will enter the intertooth spaces between the inner and outer rotors at both inlet ports and will be discharged through the aforedescribed outlet ports. However, if one of the sumps becomes dry, lubricant will still be introduced into the intertooth spaces through the inlet port connected to the other sump. Consequently, the pump does not have to run without lubrication and excessive wear on the pump is accordingly prevented. As the lubricant and air mixture is rotated in the pumping chamber, the relatively lighter air is forced towards the inner periphery of the chamber and is passed out through the air discharge port 42 and returned to the sump. The substantially air-free lubricant is delivered through the lubricant outlet ports 48 and 49 to the points of distribution.

I claim:

1. In combination with a mechanism having various parts requiring lubrication, a lubricant pumping system comprising, a plurality of lubricant sumps disposed at different locations relative to said parts to receive variable quantities of the lubricant which drains back from the parts under different operating conditions, a rotary positive-displacement type pump for withdrawing lubricant from a plurality of said sumps and for distributing the lubricant, said pump including a casing and a rotor in said casing defining a pump chamber therebetween, means extending between the rotor and the casing segregating the chamber into a plurality of compartments which rotate with the rotor, said compartments having inner and outer peripheries disposed in relatively eccentric paths whereby the compartments progressively increase in volume in a first sector of the chamber and progressively decrease in volume in a second sector of the chamber when the rotor is rotated in one direction relative to the casing, said casing having a plurality of inlet ports communicating with said first sector of the chamber at annularly spaced points and an outlet means communicating with said second sector of said chamber, distribution means connected to said outlet means for distributing lubricant to said various parts of the mechanism, and means connecting said inlet ports to different ones of said sumps whereby said pump withdraws liquid from a plurality of sumps and receives lubricant so long as lubricant remains in any one of the sumps.

2. The combination of claim 1 wherein said outlet means comprises plural outlet ports communicating with said second sector of said chamber at annularly spaced points therearound.

3. In combination with a mechanism having various parts requiring lubrication, a lubricant pumping system comprising, a plurality of lubricant sumps disposed at different locations relative to said parts to receive variable quantities of the lubricant which drains back from the parts under different operating conditions, a rotary positive-displacement type lubricant pump for withdrawing lubricant from said sumps and for conveying lubricant to a lubricant distributor, said pump including a casing and a rotor in said casing defining a pump chamber therebetween, means extending between said rotor and said casing segregating the chamber into a plurality of compartments which rotate with the rotor, said compartments having inner and outer peripheral walls disposed in relatively eccentric paths whereby the compartments progressively increase in volume in a first sector of the chamber and progressively decrease in volume in a second sector of the chamber when the rotor is turned in one direction relative to the casing, said casing having a plurality of inlet ports communicating with said first sector of the chamber at annularly spaced points and each connected to different sumps to receive lubricant and/or air therefrom, means for rotating said rotor to rotate the fluid drawn into the compartments and centrifugally separate the lubricant from any air contained in the lubricant, a first air delivery passage communicating with said second sector of said chamber in a zone contiguous to the inner peripheral wall and spaced radially from the outer peripheral wall for discharging air from the chamber, a second lubricant delivery passage communicating with said chamber at said second sector of said chamber in a zone angularly advanced in the direction of rotation of said rotor from said first zone to discharge lubricant from said chamber, and distribution means connected to said second lubricant delivery passage for distributing lubricant to said various parts of said mechanism.

4. The combination of claim 3 wherein said first air delivery passage communicates with one of said sumps.

5. In combination with a mechanism having various parts requiring lubrication, a lubricant pumping system comprising, a plurality of lubricant sumps disposed at different locations relative to said parts to receive variable quantities of the lubricant which drains back from the parts under different operating conditions, a rotary positive displacement type pump for withdrawing lubricant from a plurality of said sumps and for distributing the lubricant, said pump including an outer gerotor gear, an inner gerotor gear disposed within said outer gerotor gear eccentrically thereof defining a pump chamber therebetween and having teeth intermeshing with teeth on the outer gerotor gear to separate the pump chamber into a plurality of pumping compartments, said pump having inlet and outlet port means, means for driving said inner gerotor gear to cyclically vary the volume of said pumping compartments and to communicate said pumping compartments alternately with said inlet and outlet port means in timed relation to the cyclic variation in volume therein, said inlet port means including a plurality of inlet ports separated form each other, means connecting said inlet ports to different ones of said sumps whereby said pump withdraws liquid from a plurality of sumps and receives lubricant so long as lubricant remains in any one of the sumps, and distribution means connected to said outlet port for distributing lubricant to said various parts of said mechanism.

6. In combination with a mechanism having various parts requiring lubrication, a lubricant pumping system comprising, a plurality of lubricant sumps disposed at different locations relative to said parts to receive variable quantities of the lubricant which drains back from the parts under different operating conditions, a rotary positive-displacement type pump for withdrawing lubricant from a plurality of said sumps and for distributing the lubricant, said pump including a casing and a rotor in said casing defining a pump chamber therebetween, means extending between the rotor and the casing segregating the chamber into a plurality of compartments which rotate with the rotor, said compartments having inner and outer peripheries disposed in relatively eccentric paths whereby the compartments progressively increase in volume in a first sector of the chamber and progressively decrease in volume in a second sector of the chamber when the rotor is rotated in one direction relative to the casing, said casing having a plurality of inlet ports communicating with said first sector of the chamber at annularly spaced points, first and second outlet ports communicating with said second sector of said chamber, said second outlet port being angularly spaced in the direction of rotation of said rotor from said first outlet port, said first outlet port communicating with said second sector of said chamber in a zone contiguous to the inner periphery of the compartments and spaced radially from the outer periphery of the compartments to discharge air from the compartments, distribution means connected to said second outlet port for distributing lubricant to said various parts of the mechanism, and means connecting said inlet ports to different ones of said sumps whereby said pump withdraws liquid from a plurality of sumps and receives lubricant so long as lubricant remains in any one of the sumps.

References Cited in the file of this patent

UNITED STATES PATENTS

| 1,804,604 | Gilbert | May 12, 1931 |
| 2,280,272 | Sullivan | Apr. 21, 1942 |
| 2,832,199 | Adams | Apr. 29, 1958 |
| 2,913,069 | Kubis | Nov. 17, 1959 |

FOREIGN PATENTS

| 522,273 | Germany | Apr. 4, 1931 |
| 649,626 | Great Britain | Jan. 31, 1951 |
| 1,043,817 | Germany | Nov. 13, 1958 |